US009830752B2

(12) United States Patent
Palander

(10) Patent No.: US 9,830,752 B2
(45) Date of Patent: Nov. 28, 2017

(54) METHODS AND SYSTEMS FOR DETECTING FAULTS IN VEHICLE CONTROL SYSTEMS

(71) Applicant: NINGBO GEELY AUTOMOBILE RESEARCH & DEVELOPMENT CO., LTD., Ningbo (CN)

(72) Inventor: Michael Palander, Såvedalen (SE)

(73) Assignee: Ningbo Geely Automotive Research & Development Co., Ltd., Ningbo (CN)

( * ) Notice: Subject to any disclaimer, the term of this patent is extended or adjusted under 35 U.S.C. 154(b) by 0 days.

(21) Appl. No.: 15/250,566

(22) Filed: Aug. 29, 2016

(65) Prior Publication Data

US 2016/0364923 A1 Dec. 15, 2016

Related U.S. Application Data

(63) Continuation of application No. PCT/EP2016/054071, filed on Feb. 26, 2016.

(51) Int. Cl.
*G07C 5/08* (2006.01)
*B60W 50/02* (2012.01)
(Continued)

(52) U.S. Cl.
CPC ....... *G07C 5/0808* (2013.01); *B60W 50/0205* (2013.01); *B60W 50/04* (2013.01);
(Continued)

(58) Field of Classification Search
CPC .. B60W 50/00; B60W 50/02; B60W 50/0205; B60W 50/04; B60W 50/045; B60W 2050/021
See application file for complete search history.

(56) References Cited

U.S. PATENT DOCUMENTS 6,341,247 B1 * 1/2002 Hreha ................... B64C 13/503
244/13
2006/0047480 A1 3/2006 Lenz et al.
(Continued)

FOREIGN PATENT DOCUMENTS

JP H06160245 A 6/1994

OTHER PUBLICATIONS

PCT International Search Report mailed May 30, 2016 for PCT/EP/2016/054071, 11 pages.
(Continued)

*Primary Examiner* — Redhwan k Mawari
*Assistant Examiner* — Anshul Sood
(74) *Attorney, Agent, or Firm* — Lee & Hayes, PLLC

(57) ABSTRACT

A method for detecting faults in a vehicle control system comprising functional units having an associated unique prime number label is provided. The method comprises calling each of the functional units, the call comprising a readable and updateable integer traversal value, and in case the functional unit is operating correctly, updating the traversal value to be the product of the value in the call and the label of the currently called functional unit, and in the case of a fault, not updating the traversal value. Further, the method comprises determining from the traversal value if any functional units are faulty by a comparison with an expected traversal value, and, in the case that the traversal value is not equivalent to the expected traversal value, determining which functional units are faulty by a unique prime factorization algorithm.

19 Claims, 5 Drawing Sheets

(51) Int. Cl.
*B60W 50/04* (2006.01)
*B60W 50/00* (2006.01)
*H04L 29/08* (2006.01)

(52) U.S. Cl.
CPC ... *G07C 5/0841* (2013.01); *B60W 2050/0006* (2013.01); *B60W 2050/041* (2013.01); *H04L 67/12* (2013.01)

(56) References Cited

U.S. PATENT DOCUMENTS

| | | |
|---|---|---|
| 2009/0256685 A1 | 10/2009 | Chung et al. |
| 2012/0185126 A1 | 7/2012 | Wang et al. |
| 2013/0006697 A1 | 1/2013 | Bhaskar et al. |
| 2013/0073237 A1 | 3/2013 | Baek |

OTHER PUBLICATIONS

Xiaodong Wu, Wynne Hsu, Mong Li Lee, "A Prime Number Labeling Scheme for Dynamic Ordered XML Trees," 2013 IEEE 29th International Conference on Data Engineering (ICDE), p. 66, 2004.

* cited by examiner

METHODS AND SYSTEMS FOR DETECTING FAULTS IN VEHICLE CONTROL SYSTEMS

RELATED APPLICATIONS

This application is a continuation of PCT International Application No. PCT/EP2016/054071, filed Feb. 26, 2016, which claims foreign priority to Sweden Application No. SE 1550231-3, filed on Feb. 27, 2015, both of which are incorporated herein by reference.

TECHNICAL FIELD

The invention relates to vehicle control systems, in particular methods and systems for detecting faults in vehicle control systems.

BACKGROUND

Modern vehicle control systems are comprised of a network of systems, subsystems and controllers interacting to control the various components of the vehicle. For example a vehicle control system could comprise subsystems associated with a domain of features of the vehicle such as vehicle dynamics. Each of these subsystems may comprise one or more electronic control units (ECUs) which are associated with a feature of the domain, for example the vehicle dynamics subsystem may comprise an ECU relating to braking. The subsystems also comprise functional units that are related to that domain subsystem. A functional unit could for example be a brake actuation sensor. The functional units are often interconnected which makes detecting and locating faults rapidly a challenge.

With such vehicle control systems comprising numerous subsystems communicating and controlling various aspects of the vehicle, testing and validation of large electronic control systems is of significant importance. Furthermore, the increasing numbers of features in vehicle control systems has in turn increased the proportion of vehicle production costs associated with control systems. A fault detection method and system for vehicle control system being able to detect faults efficiently and effectively during production and development would thus decrease production costs and increase vehicle reliability.

SUMMARY OF THE INVENTION

Accordingly, the present invention preferably seeks to mitigate or eliminate one or more of the above-identified deficiencies in the art singly or in any combination and solves at least the above mentioned problems by providing a solution in accordance with the independent claims set forth below.

According to a first aspect, a method for detecting faults in a vehicle control system comprising functional units having an associated unique prime number label s provided. The method comprises calling each of the functional units, the call comprising a readable and updateable integer traversal value, and in case the functional unit is operating correctly, updating the traversal value to be the product of the value in the call and the label of the currently called functional unit, and in the case of a fault, not updating the traversal value; and determining from the traversal value if any functional units are faulty by a comparison with an expected traversal value, and, in the case that the traversal value is not equivalent to the expected traversal value, determining which functional units are faulty by a unique prime factorization algorithm.

In an embodiment, the vehicle control system comprises two or more functional units.

The unique prime label may be associated according to the ascending sequence of prime numbers starting at the number 2.

In an embodiment, faulty units are detected by comparing the traversal value with an expected traversal value, if the stored value is not equal to the expected value then the missing prime factor(s) are determined through a unique prime factorization algorithm.

The method may further comprise accessing a list, the list associating a descriptor of a functional unit to a unique prime number label, to determine the descriptor of any faulty functional units.

In an embodiment, the vehicle control system further comprises subsystems being associated with vehicle hardware, wherein the subsystems comprise the functional units, the method further comprising associating the functional units with the comprising subsystem.

In an embodiment a functional unit subset may be selected from the functional units comprised in the vehicle control system, such that only a subset of related or associated functional units are tested.

According to a second aspect a controller for detecting faults in a vehicle control system comprising functional units is provided. Each of the functional units of the vehicle control system are assigned a unique prime number from the ascending sequence of prime numbers starting at 2. The controller for detecting faults comprises a means of calling the functional units wherein the call to the functional unit comprises, a readable and updateable integer traversal value, a means of, in case the functional unit is operating correctly, updating the traversal value to be the product of the value in the call and the label of the currently called functional unit, and in the case of a fault, not updating the traversal value; and a processing unit programmed to determine which if any of the functional units are faulty by a unique prime factorization algorithm.

In an embodiment the processing unit is programmed to detect any faulty functional units by comparing the product stored in the detection signal with an expected traversal value, if the stored value is not equal to the expected traversal value then the missing prime factor(s) are determined through a unique prime factorization algorithm.

According to a third aspect a method for providing at least one implemented unit is provided. The method comprises assigning a unique prime label to a functional unit, and wherein the unique prime label is assigned from the ascending sequence of prime numbers starting at the number 2.

According to a fourth aspect a system is provided comprising a hardware component of a vehicle being associated with one or more functional units and a controller according to the third aspect.

BRIEF DESCRIPTION OF DRAWINGS

Further objects, features and advantages will appear from the following detailed description, with reference being made to the accompanying drawings, in which.

DETAILED DESCRIPTION

The following description of the invention concerns methods, controllers and systems for detecting faults in vehicle control systems comprising functional units having an associated unique prime number label. The functional units may be associated with specific components of a vehicle. For instance, the functional units may be associated with those directly related to the movement of the vehicle, such as a brake actuation sensor. The functional units may also be associated with components related to ancillary aspects of the vehicle such as a seat warming controller. Through the described methods, controllers and systems faults in one or more individual functional units can be detected and located efficiently and effectively. The vehicles control system can comprise one or more functional units, such as two or more. Functional units may be software implemented.

Figure 2:
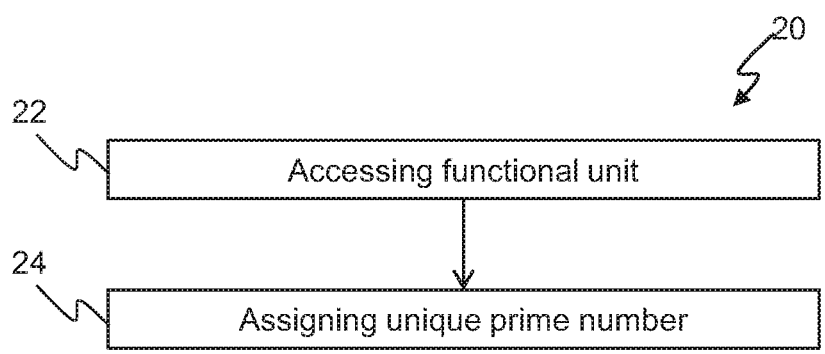
FIG. 2 is a schematic view of a method according to another embodiment.

Functional units are assigned a unique prime number label to enable identification. Such method 20 is generally depicted in FIG. 2. The unique prime number label can be assigned 24 to the functional unit during or prior to run-time, and preferably after accessing the functional unit 22. The unique prime number label acts as an identifier of the functional unit throughout the fault detection method. An ideal method of assigning the unique prime number labels is to assign labels from the ascending sequence of prime numbers starting from the prime number 2. That is, the unique prime number label of the first functional unit is assigned the number 2, the unique prime number label of the second functional unit is assigned the number 3, the unique prime number label of the third functional unit 5 and so on. The prime number 1 is preferably not used as a unique prime number label of a functional unit.

Figure 1:
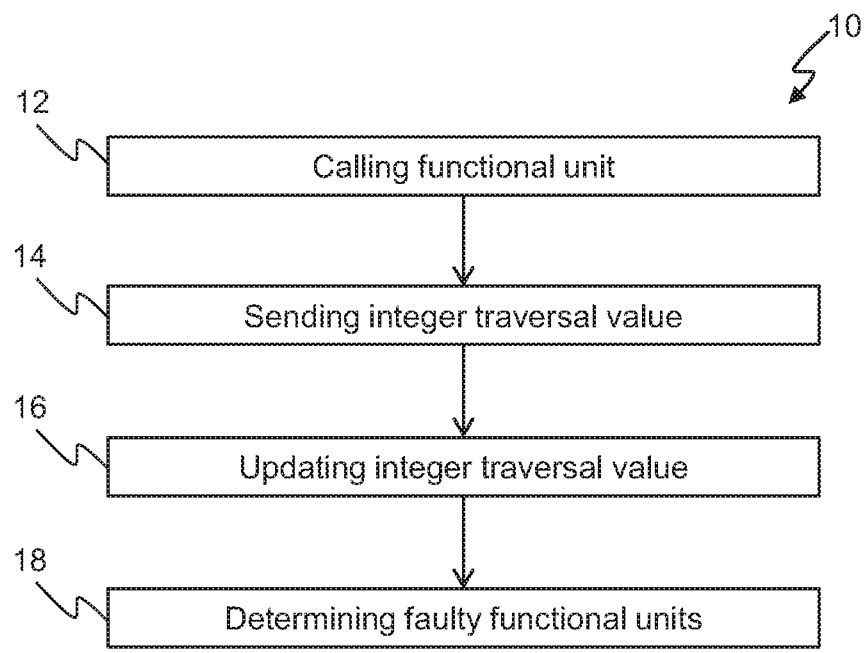
FIG. 1 is a schematic view of a method according to an embodiment.

Each functional unit can be called during the fault detection method. The fault detection method 10 is schematically shown in FIG. 1. The call 12 to the functional unit comprises a traversal value. The traversal value is an integer value which can be both read and updated by the respective receiving functional unit. The traversal value which is provided 14 to the first functional unit during fault detection is the value 1.

On receiving the call, in the case that the receiving functional unit is operating correctly, the receiving functional unit can update 16 the traversal value to be equal to the product of the traversal value comprised in the call and the unique prime label of the currently called functional unit. The multiplication results in an integer product which is the product of the receiving functional unit's unique prime label and the product of all functional units previously called that were without error. The traversal value is then updated to be equal to the product.

A faulty functional unit which is an error state will not update the traversal value. The traversal value will thus be unchanged by a functional unit which is faulty.

The traversal value is then passed in a call to the next functional unit. The next functional unit repeats the multiplication process described above with its own unique prime number label.

To determine if any of the functional units are faulty the traversal value can be compared to an expected traversal value. To determine 18 which functional units are in error a unique prime factorisation algorithm is used.

After being passed to one or more functional units the traversal value is compared to an expected traversal value. The expected traversal value may be the product of all of the unique prime number labels of functional units in the system in which faults are to be detected. For example, if the system comprised functional units with unique prime number labels 2, 3, 5, 7 then the expected value would be 2×3×5×7=210.

If the traversal value is equal to the expected traversal value then no faults have been detected in the system.

If the traversal value is not equal to the expected traversal value then one or more faulty functional units have been detected.

To determine which functional unit is faulty a unique prime factorisation algorithm is used.

One unique prime factorisation algorithm is described hereafter. The traversal value is first divided by the lowest prime factor of the traversal value. If the quotient is not a prime number then the quotient is subsequently divided by the next lowest prime. This process is repeated for the subsequent prime factors until the quotient is a prime number.

If, at any point, the quotient is a prime number then the process is stopped and the set of prime divisors is compared to the expected set of unique prime labels. The unique prime labels which are missing from the set of prime divisors are the unique prime labels of functional units which are faulty.

With this method it is possible to detect a fault in a single functional unit as described in Example 2. It is also possible to detect faults in multiple functional units. Detecting faults in multiple functional units is described in Example 3.

The vehicle control system may also comprise subsystems being associated with vehicle hardware. In such a case the subsystems comprise the functional units. For example, a drivetrain subsystem could comprise multiple functional units associated with of the combined pieces of hardware associated with the vehicle's drivetrain.

If the functional units are comprised in subsystems then the method of detecting faults may further comprise associating the functional units with the comprising subsystem.

The method of detecting faults in a vehicle control system may also comprise a step for determining which hardware component is associated with a functional unit. The method can comprise accessing a list associating a hardware descriptor to a functional unit. The list may comprise a sequence of unique prime number labels, being the unique prime number labels of the function units. The list may also comprise a text based or other descriptor of which vehicular hardware component is related to each unique prime number label. The descriptor could be any machine or human readable descriptor or ID of a vehicular hardware component.

Also disclosed herein is a controller for detecting faults in a vehicle control system comprising functional units. For identification each of the functional units of the vehicle control system can be assigned a unique prime number label from the ascending sequence of prime numbers starting at 2.

The controller for detecting faults further comprises a means of calling the functional units wherein the call to the functional unit comprises, a readable and updateable traversal value for enabling identification of which functional units are faulty. The controller comprises a means of, in case the functional unit is operating correctly, updating the traversal value to be the product of the traversal value comprised in the call and the unique prime label of the currently called functional unit, and in the case of a fault, not updating the traversal value.

The controller further detects whether the functional units are faulty as it is provided with means of comparing the traversal value with an expected traversal value, and a means of determining which functional units are faulty. In case the traversal value is equal to the expected traversal value then no faults have been detected in the vehicle control system. In the case that the traversal value is not equal to the expected traversal value the controller one or more faults are present in the vehicle control system. The controller can determine which functional units are faulty by a unique prime factorisation algorithm.

A vehicle may comprise a system comprising at least one hardware component of a vehicle associated with one or more functional units and a controller according to the description above. For example a system could comprise a hardware component such as a brake actuation sensor, a controller as described above, and at least one functional unit. The system may further comprise a list associating a hardware component descriptor to a functional unit.

Figure 3:
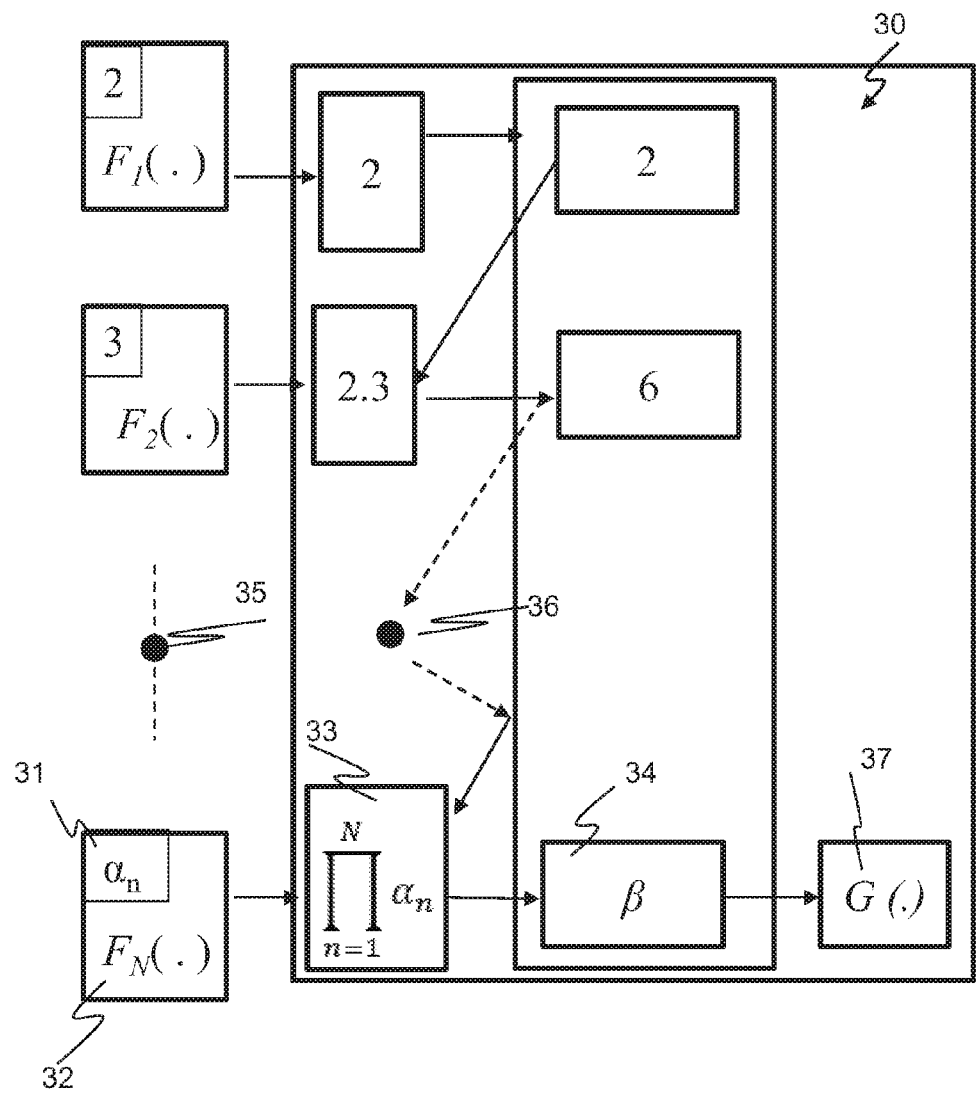
FIG. 3 is a blocksheet diagram of the method according to an embodiment.

A blocksheet representation 30 of the method and the controller according to an embodiment is presented in FIG. 3. The unique prime number label 31 identifies a functional unit 32. A multiplier 33 may be present which multiplies the product of the traversal value and the unique prime number label 31. A memory unit 34 may store the product of the traversal value and the unique prime number label. A plurality of functional units 35, 36 may be present. A fault comparator and unique prime factorisation unit 37 can determine if any functional units are faulty and if so, which units are faulty.

The functional units may be connected in series. The functional units may also be connected in parallel. The functional units may also be connected in a combination of series and parallel.

In an embodiment the functional units may be a subgroup selected from the functional units comprised in the vehicle control system. In such an embodiment the functional unit subgroup may be associated with a specific function of the vehicle. The functional unit subgroup may in an embodiment be associated with multiple related functions of the vehicle. The expected traversal value of the functional unit subgroup is the product of the unique prime number label of each of the functional units comprised in the functional unit subgroup.

A processing unit is responsible for the overall operation and control of the method. The processing unit may be implemented in any known controller technology, including but not limited to a processor (PLC, CPU, DSP), FPGA, ASIC or any other suitable digital and/or analogue circuitry capable of performing the intended functionality. The processing unit constitutes an implementation of the method described herein.

Finally, the system and controller may have a memory which is operatively connected to the processing unit. The memory may be implemented by any known memory technology, including but not limited to E(E)PROM, S(D)RAM and flash memory, and it may also include secondary storage such as a magnetic or optical disc. Physically, the memory may consist of one unit or a plurality of units which together constitute the memory on a logical level. In addition to storing various program instructions and data for the various functions and applications which are typically available, the memory also comprises program instructions and work data for a control software application executed in the controller, system or processing unit.

EXAMPLES

Example 1—No Faults Present

A vehicle control system comprises 4 functional units $F_{1-4}$, the functional units are assigned the following unique prime labels according to the sequence of unique primes starting at the number 2.

| Functional Unit | Unique prime label |
| --- | --- |
| $F_1$ | 2 |
| $F_2$ | 3 |
| $F_3$ | 5 |
| $F_4$ | 7 |

The first functional unit, $F_1$, is called with an initial traversal value of 1. The first functional unit, $F_1$, is not in error and updates the traversal value to be equal to $1 \times 2 = 2$. The second functional unit in series, $F_2$, is then called with a traversal value of 2. The second functional unit, $F_2$, is not in error and updates the traversal value to be equal to $2 \times 3 = 6$. The third functional unit, $F_3$, is then called with a traversal value of 6. The third functional unit, $F_3$, is not in error and updates the traversal value to be equal to $6 \times 5 = 30$. The fourth functional unit, $F_4$, is then called with a traversal value of 30. The fourth functional unit, $F_4$, is not in error and updates the traversal value to be equal to $30 \times 7 = 210$.

The traversal value is then compared with the expected traversal value. In this case the expected traversal value is $2 \times 3 \times 5 \times 7 = 210$. The values are equal and hence no faults were detected in the system.

Figure 4:
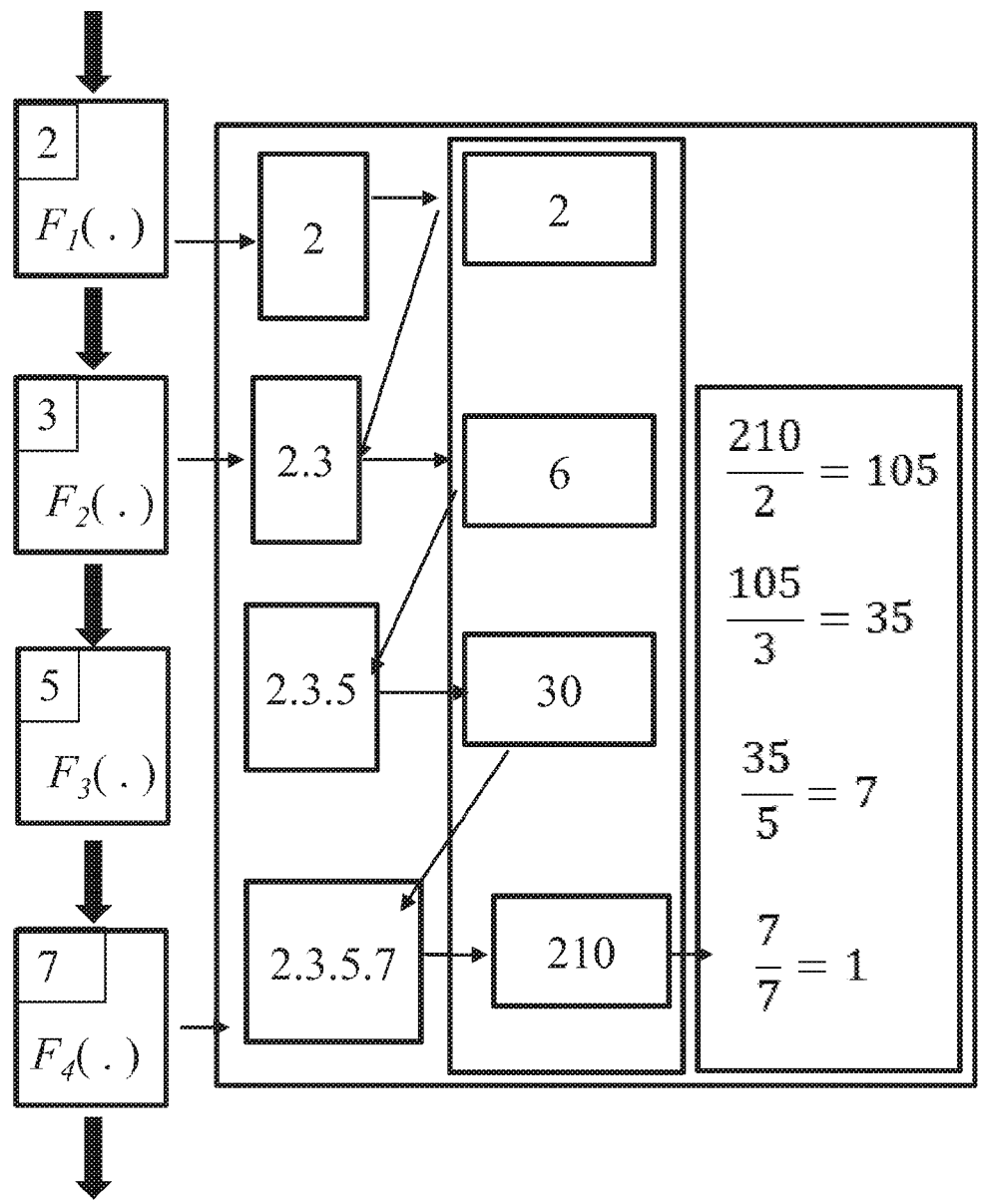
FIG. 4 is a blocksheet diagram of the method according to example 1.

This example is presented as a blocksheet in FIG. 4.

Example 2—One Fault Detected

A vehicle control system comprises 4 functional units $F_{1-4}$, the functional units are assigned the following unique prime labels according to the sequence of unique primes starting at the number 2.

| Functional Unit | Unique prime label |
| --- | --- |
| $F_1$ | 2 |
| $F_2$ | 3 |
| $F_3$ | 5 |
| $F_4$ | 7 |

The first functional unit, $F_1$, is called with an initial traversal value of 1. The first functional unit, $F_1$, is in error and does therefore not update the traversal value. The second functional unit, $F_2$, is then called with a traversal value of 1, the non-updated traversal value. The second functional unit, $F_2$, is not in error and updates the traversal value to be equal to $1 \times 3 = 3$. The third functional unit, $F_3$, is then called with a traversal value of 3. The third functional unit, $F_3$, is not in error and updates the traversal value to be equal to $3 \times 5 = 15$. The fourth functional unit, $F_4$, is then called with a traversal value of 15. The fourth functional unit, $F_4$, is not in error and updates the traversal value to be equal to $15 \times 7 = 105$.

The real traversal value is then compared with the expected traversal value. In this case the expected traversal value is $2 \times 3 \times 5 \times 7 = 210$. The values are not equal and thus fault is present in the vehicle's control system.

The functional unit which was in error can be determined through a prime factorization algorithm as described above.

The real traversal value is divided by the lowest prime factor. The lowest prime factor of 105 is 3. Accordingly 105 is divided by 3, resulting in a quotient of 35. The factor 3 is added to a set of real traversal value factors. The previous quotient 35 is then divided by the next lowest prime factor, 5, resulting in a quotient of 7. The factor 5 is added to the set of real traversal value factors. The previous quotient 7 is then divided by the next lowest prime factor, 7, resulting in a quotient of 1. The factor 7 is added to the set of real traversal value factors. As the previous quotient is 1, a prime number, the algorithm is stopped.

The set of real traversal value factors is then compared to the expected set of unique prime labels.

Real traversal value factors={3,5,7}
Expected set of unique prime labels={2,3,5,7}

In this example, the missing factor is 2. Thus the functional unit with the label 2 is faulty.

The functional unit with the label 2 can thereafter be compared to a list associating functional units with subsystems and specific hardware components of the vehicle. For instance, the functional unit with the unique prime label 2 may be comprised within a subsystem relating to vehicle dynamics and associated with the brake actuation sensor.

Figure 5:
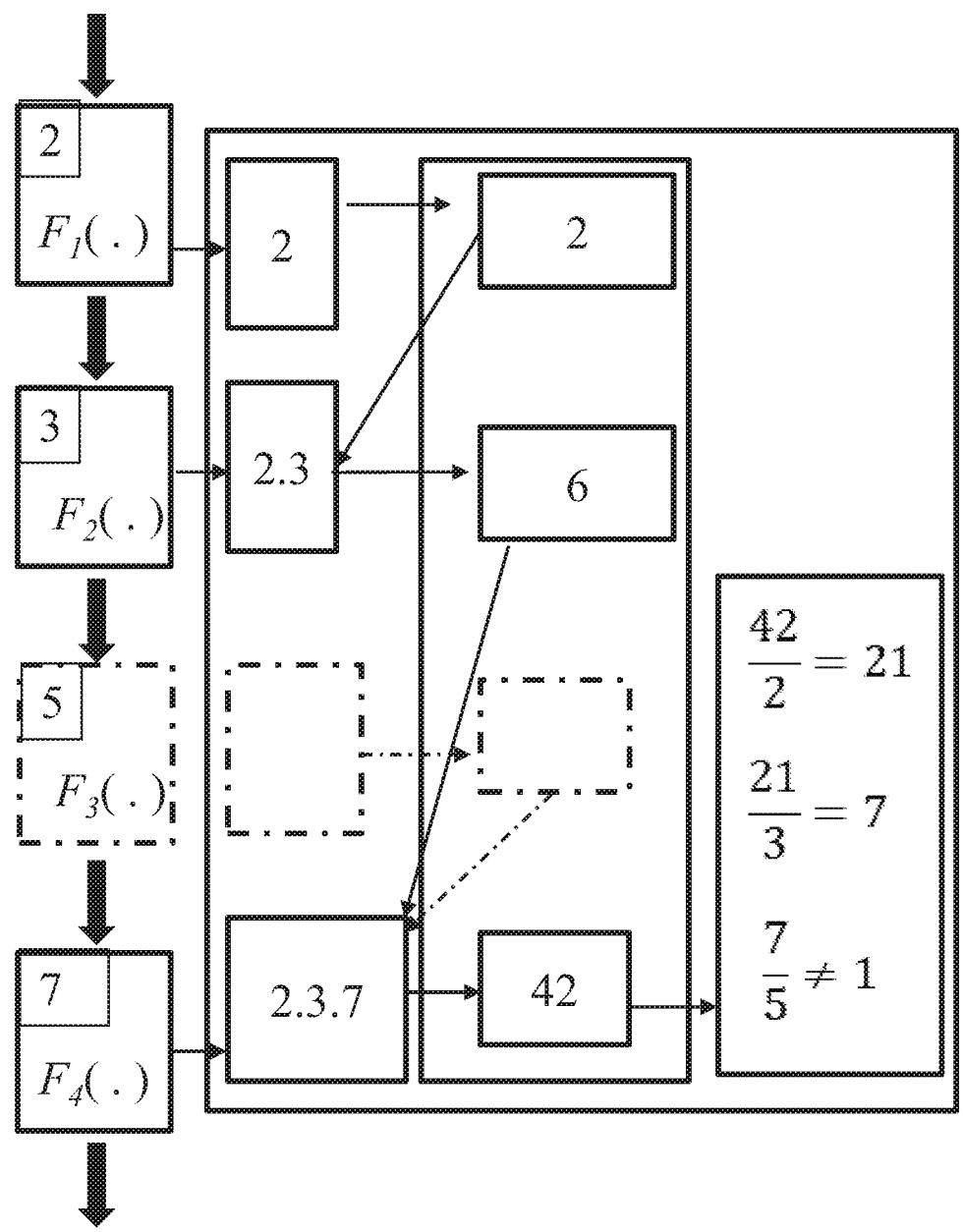
FIG. 5 is a blocksheet diagram of the method according to example 2.

This example is presented as a blocksheet in FIG. 5.

Example 3—Two Faults Detected

A vehicle control system comprises 4 functional units $F_{1-4}$, the functional units are assigned the following unique prime labels according to the sequence of unique primes starting at the number 2.

| Functional Unit | Unique prime label |
| --- | --- |
| $F_1$ | 2 |
| $F_2$ | 3 |
| $F_3$ | 5 |
| $F_4$ | 7 |

The first functional unit, $F_1$, is called with an initial traversal value of 1. The first functional unit, $F_1$, is in error and does therefore not update the traversal value. The second functional unit, $F_2$, is then called with a traversal value of 1, the non-updated traversal value. The second functional unit, $F_2$, is not in error and updates the traversal value to be equal to 1×3=3. The third functional unit, $F_3$, is then called with a traversal value of 3. The third functional unit, $F_3$, is in error and does therefore not update the traversal value. The fourth functional unit, $F_4$, is then called with a traversal value of 3. The fourth functional unit, $F_4$, is not in error and updates the traversal value to be equal to 3×7=21.

The real traversal value is then compared with the expected traversal value. In this case the expected traversal value is 2×3×5×7=210. The real traversal value is 21. The values are not equal and thus fault is present in the vehicle's control system.

The functional unit which was in error can be determined through a prime factorization algorithm as described above.

The real traversal value is divided by the lowest prime factor. The lowest prime factor of 21 is 3. Accordingly 21 is divided by 3, resulting in a quotient of 7. The factor 3 is added to a set of real traversal value factors. As the previous quotient is 7, a prime number, the algorithm is stopped.

The set of real traversal value factors is then compared to the expected set of unique prime labels.

Real traversal value factors={3,7}
Expected set of unique prime labels={2,3,5,7}

In this example, there are two missing factors, 2 and 5. Thus the functional units with the labels 2 and 5 are faulty.

The functional unit with the labels 2 and 5 can thereafter be compared to a list associating functional units with subsystems and specific hardware components of the vehicle as above.

Figure 6:
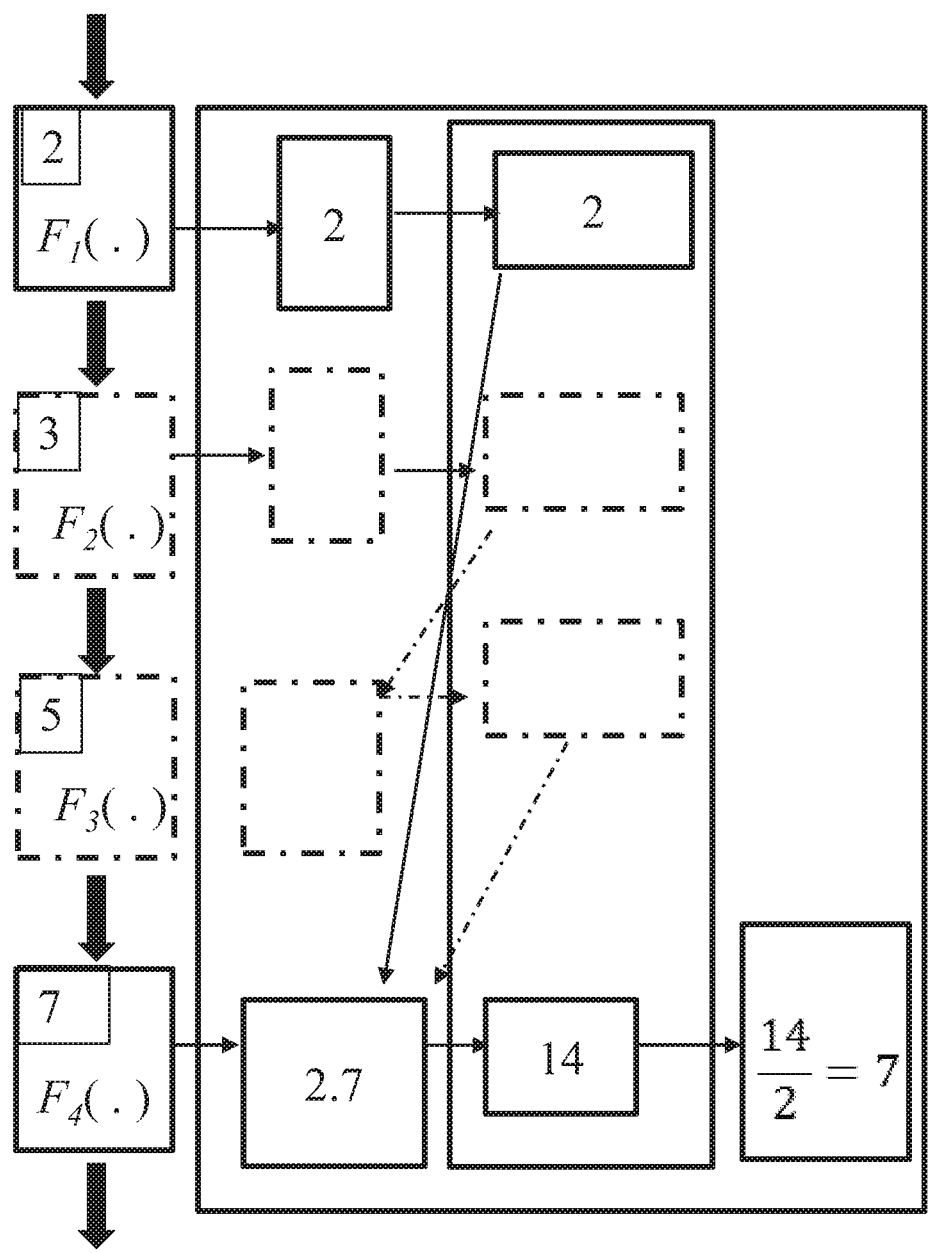
FIG. 6 is a blocksheet diagram of the method according to example 3.

This example is presented as a blocksheet in FIG. 6.

What is claimed is:

1. A method for detecting faults in a vehicle control system comprising functional units having an associated unique prime number label, the method comprising:
   calling, with a controller, each of the functional units, the call comprising a readable and updateable integer traversal value, and in case the functional unit is operating correctly, updating the traversal value to be the product of the value in the call and the label of a currently called functional unit, and in the case of a fault, not updating the traversal value;
   determining, with the controller, from the traversal value if any functional units are faulty by a comparison with an expected traversal value, and, in the case that the traversal value is not equivalent to the expected traversal value, determining which functional units are faulty by a unique prime factorization algorithm.

2. The method according to claim 1 wherein the vehicle control system comprises three or more functional units.

3. The method according to claim 2 wherein the unique prime label is associated according to the ascending sequence of prime numbers starting at the number 2.

4. The method according to claim 2 wherein faulty units are detected by comparing the traversal value with an expected traversal value, if the traversal value is not equal to the expected value then one or more missing prime factor(s) are determined through a unique prime factorization algorithm.

5. The method according to claim 2 wherein the method further comprises accessing a list, the list associating a descriptor of a functional unit to a unique prime number label, to determine the descriptor of any faulty functional units.

6. The method according to claim 2 wherein the vehicle control system further comprises subsystems being associated with vehicle hardware, wherein the subsystems comprise the functional units, the method further comprising associating the functional units with the comprising subsystem.

7. The method according to claim 2 wherein a functional unit subset is selected from the functional units comprised in the vehicle control system, and wherein the expected traversal value of the functional unit subset is the product of the unique prime number label of each of the functional units comprised in the functional unit subset.

8. The method according to claim 1 wherein the unique prime label is associated according to the ascending sequence of prime numbers starting at the number 2.

9. The method according to claim 8 wherein faulty units are detected by comparing the traversal value with an expected traversal value, if the traversal value is not equal to the expected value then one or more missing prime factor(s) are determined through a unique prime factorization algorithm.

10. The method according to claim 8 wherein the method further comprises accessing a list, the list associating a descriptor of a functional unit to a unique prime number label, to determine the descriptor of any faulty functional units.

11. The method according to claim 1 wherein faulty units are detected by comparing the traversal value with an expected traversal value, if the traversal value is not equal to the expected value then one or more missing prime factor(s) are determined through a unique prime factorization algorithm.

12. The method according to claim 11 wherein the method further comprises accessing a list, the list associating a descriptor of a functional unit to a unique prime number label, to determine the descriptor of any faulty functional units.

13. The method according to claim 1 wherein the method further comprises accessing a list, the list associating a descriptor of a functional unit to a unique prime number label, to determine the descriptor of any faulty functional units.

14. The method according to claim 1 wherein the vehicle control system further comprises subsystems being associated with vehicle hardware, wherein the subsystems comprise the functional units, the method further comprising associating the functional units with the comprising subsystem.

15. The method according to claim 1 wherein a functional unit subset is selected from the functional units comprised in the vehicle control system, and wherein the expected traversal value of the functional unit subset is the product of the unique prime number label of each of the functional units comprised in the functional unit subset.

16. A controller for detecting faults in a vehicle control system comprising:
a processing unit, in communication with functional units, each of the functional units assigned a unique prime number label from an ascending sequence of prime numbers starting at 2, the processing unit programmed to determine which, if any, of the functional units are faulty with a unique prime factorization algorithm;
memory storing computer-executable instructions that, when executed, cause the processing unit to:
call the functional units, wherein the call to a first functional unit of the functional units comprises a readable and updateable integer traversal value, and wherein in case the first functional unit is operating correctly, updating the traversal value to be the product of the value in the call and the label of the first functional unit, and in the case of a fault, not updating the traversal value.

17. The controller according to claim 16 wherein the processing unit is programmed to detect any faulty functional units by comparing the traversal value received from the functional units with an expected traversal value, if the traversal value is not equal to the expected traversal value then one or more missing prime factor(s) are determined through a unique prime factorization algorithm.

18. A system comprising a hardware component of a vehicle being associated with one or more functional units and a controller according to claim 16.

19. A system comprising a hardware component of a vehicle being associated with one or more functional units and a controller according to claim 17.

* * * * *